US008888122B2

(12) United States Patent
Berry

(10) Patent No.: US 8,888,122 B2
(45) Date of Patent: Nov. 18, 2014

(54) PIVOTING AXLE SYSTEM

(71) Applicant: JLG Industries, Inc., Hagerstown, MD (US)

(72) Inventor: Dave Berry, Hagerstown, MD (US)

(73) Assignee: JLG Industries, Inc., Hagerstown, MD (US)

( * ) Notice: Subject to any disclaimer, the term of this patent is extended or adjusted under 35 U.S.C. 154(b) by 0 days.

(21) Appl. No.: 13/789,728

(22) Filed: Mar. 8, 2013

(65) Prior Publication Data
US 2013/0241161 A1 Sep. 19, 2013

Related U.S. Application Data

(60) Provisional application No. 61/612,597, filed on Mar. 19, 2012.

(51) Int. Cl.
*B60G 7/00* (2006.01)
*B66C 23/62* (2006.01)
*B66F 9/075* (2006.01)
*B60G 3/02* (2006.01)
*B60B 35/10* (2006.01)

(52) U.S. Cl.
CPC . *B60G 7/00* (2013.01); *B66C 23/62* (2013.01); *B66F 9/07522* (2013.01); *B60G 3/02* (2013.01); *B60B 35/10* (2013.01); *B60B 35/1054* (2013.01); *B60G 2300/40* (2013.01); *B60Y 2200/15* (2013.01)
USPC .......................................... 280/638; 180/212

(58) Field of Classification Search
CPC ............ B60G 3/02; B60G 3/08; B60G 3/145; B60G 7/00; B60G 7/003; B60G 7/006; B60G 2200/422; B60G 2206/50; B60G 2300/09; B60G 2300/40; B60D 55/112; B60D 7/142; B60D 21/14; B60D 7/06; B60D 49/0678; B60B 35/10; B60B 35/1054; B60B 35/109; B60B 29/008; B66F 9/07522
USPC ........ 280/5.52, 6.15, 638; 180/209, 212, 253, 180/41
See application file for complete search history.

(56) References Cited

U.S. PATENT DOCUMENTS 3,306,390 A   2/1967   Jamme
3,899,037 A   8/1975   Yuker

FOREIGN PATENT DOCUMENTS

EP          1 580 100        9/2005
GB          2 402 658        12/2004
WO      WO 2005/056308      6/2005

*Primary Examiner* — Ruth Ilan
*Assistant Examiner* — Timothy Wilhelm
(74) *Attorney, Agent, or Firm* — Nixon & Vanderhye P.C.

(57) ABSTRACT

A pivoting axle system for an aerial lift vehicle includes a plurality of axles pivotally secured to the vehicle chassis at respective pivot points between a stowed position and a working position. Each axle is coupleable with a wheel assembly at distal ends thereof. Actuators are connected between the chassis and each of the plurality of axles, respectively, where the actuators are connected to the chassis at positions spaced from the pivot points, respectively. Additionally, each of the plurality of axles is independently controllable.

14 Claims, 2 Drawing Sheets

PIVOTING AXLE SYSTEM

CROSS-REFERENCES TO RELATED APPLICATIONS

This application claims the benefit of U.S. Provisional Patent Application Ser. No. 61/612,597, filed Mar. 19, 2012, the entire content of which is herein incorporated by reference.

STATEMENT REGARDING FEDERALLY SPONSORED RESEARCH OR DEVELOPMENT (Not Applicable)

BACKGROUND OF THE INVENTION

The invention relates to a boom lift product and, more particularly, to supporting structure for a boom lift product that is expandable and retractable between a stowed/transport position and a working position.

It is desirable with a boom lift product to provide a stable and secure base when a platform supported at an end of an extendible boom is used in a raised position. Stability can be achieved through the use of outriggers, counterweights and the like. A wider wheel base also provides added stability, but a wider wheel base has limitations for transport since a width of the more stable wheel base typically exceeds maximum limitations for transport or on-road travel.

It would be desirable for supporting structure for a boom lift product to include an adjustable wheel base that is wider in a working position and narrower for transport.

BRIEF SUMMARY OF THE INVENTION

The invention provides for a pivoting axle system for a boom lift where separate axles for each of the vehicle's four wheels are pivotable for operation in a stowed (transport) position and an extended (working) position.

In an exemplary embodiment, a pivoting axle system for an aerial lift vehicle includes a plurality of axles pivotally secured to the chassis at respective pivot points between a stowed position and a working position. Each axle is coupleable with a wheel assembly at distal ends thereof. Actuators are connected between the chassis and each of the plurality of axles, respectively, where the actuators are connected to the chassis at positions spaced from the pivot points, respectively. Additionally, each of the plurality of axles is independently controllable.

Actuator brackets may be connected to each of the plurality of axles, respectively, where the actuators are connected between the chassis and respective connecting points of the actuator brackets, and the connecting points are positioned offset from longitudinal axes of the axles. In one arrangement, the actuators are hydraulic actuators.

Each of the plurality of axles may include a multi-section telescoping assembly with a base section that is connected to the chassis and at least one movable section that is extendable and retractable relative to the base section. The wheel assemblies are connected to the axles at distal ends of the movable sections, respectively. The multi-section telescoping assembly may additionally include a ram connected between the base section and the movable section, where the ram drives the movable section relative to the base section between an extended position and a retracted position.

The plurality of axles may be disconnected from one another and operable separately from one another.

In one construction, the plurality of axles includes two front axles and two rear axles, the two front axles respectively supporting a corresponding two front wheel assemblies, and the two rear axles respectively supporting a corresponding two rear wheel assemblies. In the working position, the two front wheel assemblies are spaced farther apart than in the stowed position, and the two rear wheel assemblies are spaced farther apart than in the stowed position.

In another exemplary embodiment, an aerial lift vehicle includes a chassis supporting lift vehicle components, and a pivoting axle system coupled with the chassis. The pivoting axle system corresponds to the system summarized above. The aerial lift vehicle may include a drive system communicating with the wheel assemblies, where the actuators are configured to pivot the plurality of axles between the stowed position and the working position while the drive system drives the wheel assemblies.

In yet another exemplary embodiment, a pivoting axle system for an aerial lift vehicle includes a pair of front axles supporting a corresponding pair of front wheels and a pair of rear axles supporting a corresponding pair of rear wheels. The front and rear axles are pivotally secured to the chassis at respective pivot points, where the front and rear axles are selectively positionable between a transport position, where the front wheels are a first distance apart from each other and the rear wheels are a second distance apart from each other, and a working position, where the front wheels are a third distance apart from each other and the rear wheels are a fourth distance apart from each other. The third distance is greater than the first distance, and the fourth distance is greater than the second distance.

BRIEF DESCRIPTION OF THE DRAWINGS

These and other aspects and advantages of the preferred embodiments will be described in detail with reference to the accompanying drawings, in which.

DETAILED DESCRIPTION OF THE INVENTION

Figure 1:
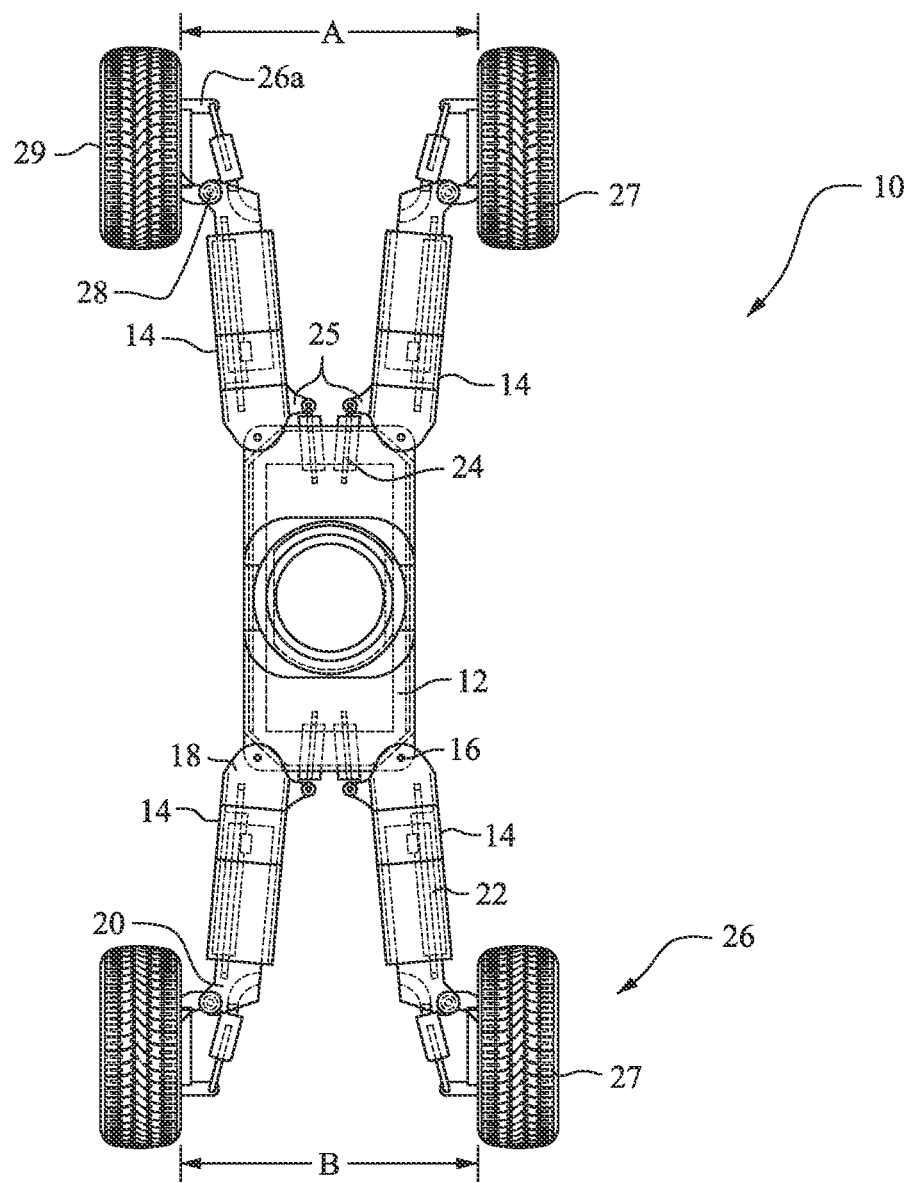
FIG. 1 shows a chassis assembly with the pivoting axle system in a stowed position.
Figure 2:
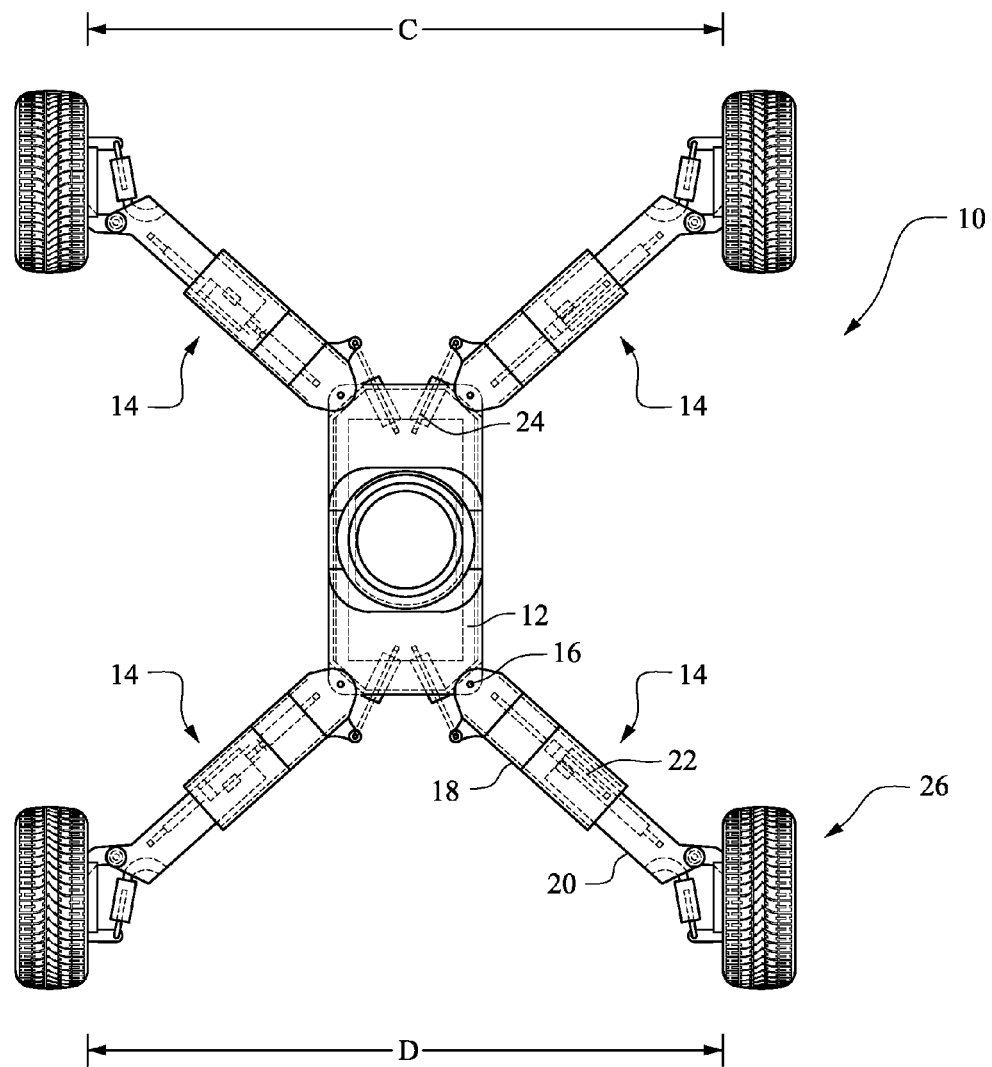
FIG. 2 shows the chassis assembly with the pivoting axle system in a working position.

FIG. 1 shows a chassis assembly according to preferred embodiments of the invention in the stowed position, and FIG. 2 shows the chassis assembly in the working position. The chassis assembly 10 includes a chassis 12 and four independently controllable axles 14, including a pair of front axles and a pair of rear axles. Each of the axles 14 is pivotally secured to the chassis 12 via a pivot connection 16. Each axle 14 is independently controllable (i.e., separately operable), and the respective axles 14 are not connected to one another. Actuators 24 are connected between the chassis 12 and each of a plurality of axles 14, respectively. As shown in the drawings, the actuators 24 are connected to the chassis 12 at positions spaced from the pivot points 16. Actuator brackets 25 are connected to each of the plurality of axles 14, respectively. The actuators 24 are connected between the chassis 12 and respective connecting points of the actuator brackets 25. As shown, the connecting points are positioned offset from longitudinal axes of the axles 14. Preferably, the actuators 24 are hydraulic actuators.

Each of the axles 14 may possibly be provided as a multi-section telescoping axle (two-section shown) including at least a base section 18, which is pivoted to the chassis 12 via the pivot connection 16, and a movable section 20 mounted to extend or retract relative to the base section 18 on operation of drive means within the sections. An exemplary drive means includes a ram 22 (e.g., a hydraulic ram) connected between the base section 18 and the movable section 20.

A tire or wheel assembly 26 including a spindle and king pin 26*a* is mounted at an outer (distal) end of the inner section 20. The wheel assemblies 26 include respective wheels or tires 27. A steering pivot axis 28 is offset from both a rotating axis 29 of the wheel and a plane through a center of the wheel tread. The axles 14 and tire assembly 26 act as a support for the chassis 12. As shown, the vehicle includes four such support assemblies. That is, the two front axles support a corresponding two front wheel assemblies, and the two rear axles support a corresponding two rear wheel assemblies.

In the stowed or transport position (FIG. 1), the axles 14 are moved inward via the cylinders 24, and the front wheel assemblies (and the rear wheel assemblies) are closer together to facilitate transport. That is, in the stowed position, the front wheels are a first distance apart from each other (see arrow A in FIG. 1) and the rear wheels are a second distance apart from each other (see arrow B in FIG. 1). With the telescoping axles, in the stowed position, the inner sections 20 are fully retracted. In the working position, the axles 14 are pivoted outwards such that the front wheel assemblies (and the rear wheel assemblies) are farther apart to provide added stability. That is, in the working position, the front wheels are a third distance apart from each other (see arrow C in FIG. 2) and the rear wheels are a fourth distance apart from each other (see arrow D in FIG. 2). As shown, the third distance C is greater than the first distance A, and the fourth distance D is greater than the second distance B. With the telescoping axles, the inner sections 20 are telescopically extended in the working position.

To accommodate ground friction and to facilitate shifting the assembly between positions, it is typical for the vehicle to be moving when extending or retracting the chassis assembly. That is, the vehicle drive system communicates with the wheel assemblies 26, and the actuators 24 are configured to pivot the plurality of axles 14 between the stowed position and the working position while the drive system drives the wheel assemblies.

Because the axles 14 and tire assemblies 26 are independently controllable, the system can operate in various steering modes including, without limitation, straight steering, crab steering, two-wheel steering, coordinated steering, etc.

The pivoting axle system of the described embodiments provides for stability in a working position reducing the need for outriggers or possibly eliminating counterweights, while being shiftable to a retracted position including a wheel base width that is suitable for transport. The axles supporting respective wheel assemblies are independently operable and can readily accommodate irregularities in terrain.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A pivoting axle system for an aerial lift vehicle including a chassis, the pivoting axle system comprising:
    a plurality of axles pivotally secured to the chassis at respective pivot points between a stowed position and a working position, each axle coupleable with a wheel assembly at distal ends thereof, wherein each wheel assembly includes a wheel with a wheel tread; and
    actuators connected between the chassis and each of the plurality of axles, respectively, wherein the actuators are connected to the chassis at positions spaced from the pivot points, respectively,
    wherein each of the plurality of axles is independently controllable, and wherein each wheel assembly comprises a spindle and king pin mounted to a respective one of the plurality of axles, a steering pivot axis being offset from both a rotating axis of the wheel and a plane through a center of the wheel tread.

2. A pivoting axle system according to claim 1, further comprising actuator brackets connected to each of the plurality of axles, respectively, wherein the actuators are connected between the chassis and respective connecting points of the actuator brackets, and wherein the connecting points are positioned offset from longitudinal axes of the axles.

3. A pivoting axle system according to claim 1, wherein the actuators comprise hydraulic actuators.

4. A pivoting axle system according to claim 1, wherein the plurality of axles are disconnected from one another and operable separately from one another.

5. A pivoting axle system according to claim 1, wherein the plurality of axles comprise two front axles and two rear axles, the two front axles respectively supporting a corresponding two front wheel assemblies, and the two rear axles respectively supporting a corresponding two rear wheel assemblies.

6. A pivoting axle system according to claim 5, wherein in the working position, the two front wheel assemblies are spaced farther apart than in the stowed position, and the two rear wheel assemblies are spaced farther apart than in the stowed position.

7. A pivoting axle system for an aerial lift vehicle including a chassis, the pivoting axle system comprising:
    a plurality of axles pivotally secured to the chassis at respective pivot points between a stowed position and a working position, each axle coupleable with a wheel assembly at distal ends thereof; and
    actuators connected between the chassis and each of the plurality of axles, respectively, wherein the actuators are connected to the chassis at positions spaced from the pivot points, respectively,
    wherein each of the plurality of axles is independently controllable, wherein each of the plurality of axles comprises a multi-section telescoping assembly including a base section that is connected to the chassis and at least one movable section that is extendable and retractable relative to the base section, and wherein the wheel assemblies are connected to the axles at distal ends of the movable sections, respectively.

8. A pivoting axle system according to claim 7, wherein the multi-section telescoping assembly further comprises a ram connected between the base section and the movable section, the ram driving the movable section relative to the base section between an extended position and a retracted position.

9. An aerial lift vehicle comprising:
    a chassis supporting lift vehicle components; and
    a pivoting axle system coupled with the chassis, the pivoting axle system including:
        a plurality of axles pivotally secured to the chassis at respective pivot points between a stowed position and a working position, each axle coupleable with a wheel assembly at distal ends thereof, wherein each wheel assembly includes a wheel with a wheel tread, and
        actuators connected between the chassis and each of the plurality of axles, respectively, wherein the actuators are connected to the chassis at positions spaced from the pivot points, respectively, wherein each of the plurality of axles is independently controllable, and wherein each wheel assembly comprises a spindle and king pin mounted to a respective one of the plurality of axles, a steering pivot axis being offset from both a rotating axis of the wheel and a plane through a center of the wheel tread.

10. An aerial lift vehicle according to claim 9, wherein the pivoting axle system comprises actuator brackets connected to each of the plurality of axles, respectively, wherein the actuators are connected between the chassis and respective connecting points of the actuator brackets, and wherein the connecting points are positioned offset from longitudinal axes of the axles.

11. An aerial lift vehicle according to claim 9, further comprising a drive system communicating with the wheel assemblies, wherein the actuators are configured to pivot the plurality of axles between the stowed position and the working position while the drive system drives the wheel assemblies.

12. A pivoting axle system for an aerial lift vehicle including a chassis, the pivoting axle system comprising a pair of front axles supporting a corresponding pair of front wheels with wheel treads and a pair of rear axles supporting a corresponding pair of rear wheels with wheel treads, the front and rear axles being pivotally secured to the chassis at respective pivot points, wherein the front and rear axles are selectively positionable between a transport position, where the front wheels are a first distance apart from each other and the rear wheels are a second distance apart from each other, and a working position, where the front wheels are a third distance apart from each other and the rear wheels are a fourth distance apart from each other, the third distance being greater than the first distance, and the fourth distance being greater than the second distance, each of the front and rear wheels being connected to the front and rear axles, respectively, with a spindle and king pin, wherein a steering pivot axis of each of the wheels is offset from both a rotating axis of the wheel and a plane through a center of the wheel tread.

13. A pivoting axle system according to claim 12, wherein each of the front and rear axles is independently controllable.

14. A pivoting axle system according to claim 13, further comprising actuators connected between the chassis and each of the front and rear axles, wherein the actuators are connected to the chassis at positions spaced from the pivot points.

* * * * *